Figure 1:
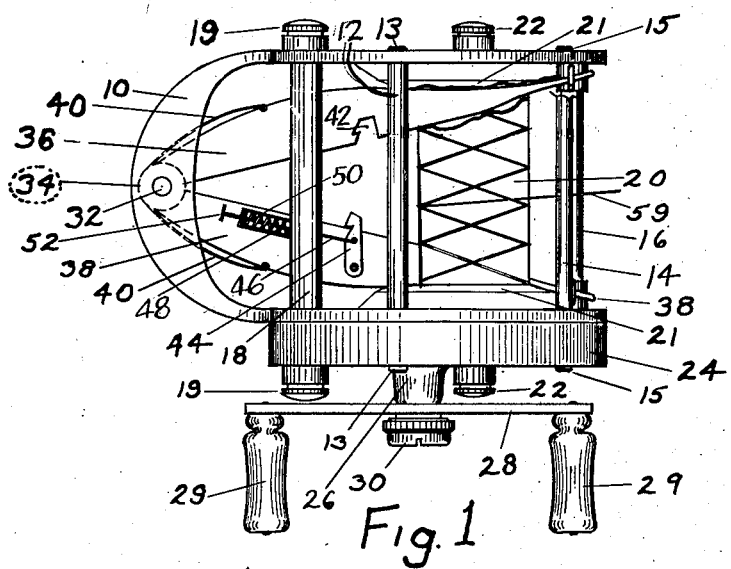

June 9, 1953  W. P. KINSEY  2,641,417
FISHING REEL

Filed Sept. 11, 1947  3 Sheets-Sheet 1

INVENTOR.
WILLIAM P. KINSEY
BY
Rey Eleis
ATTORNEY

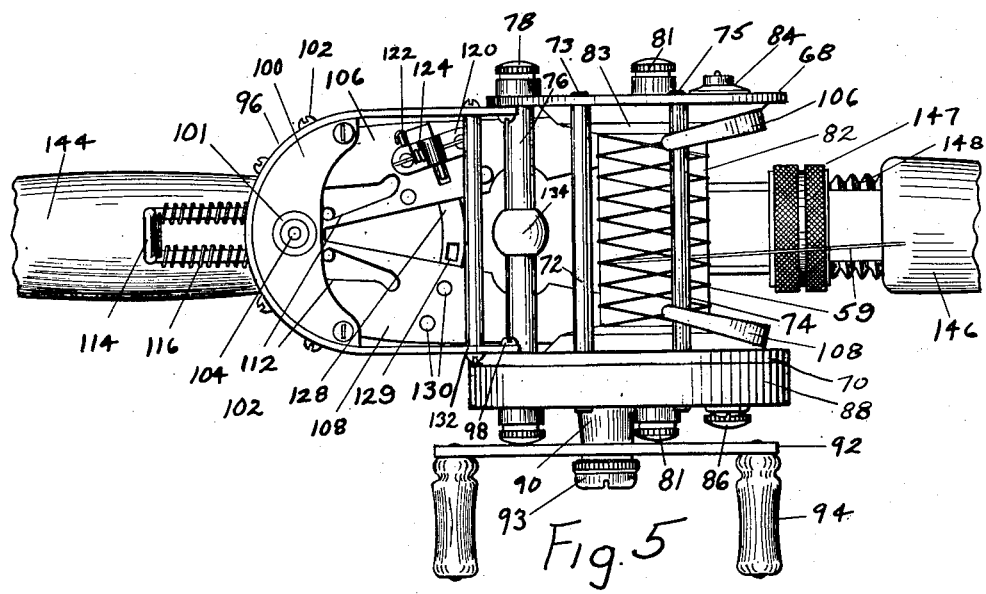
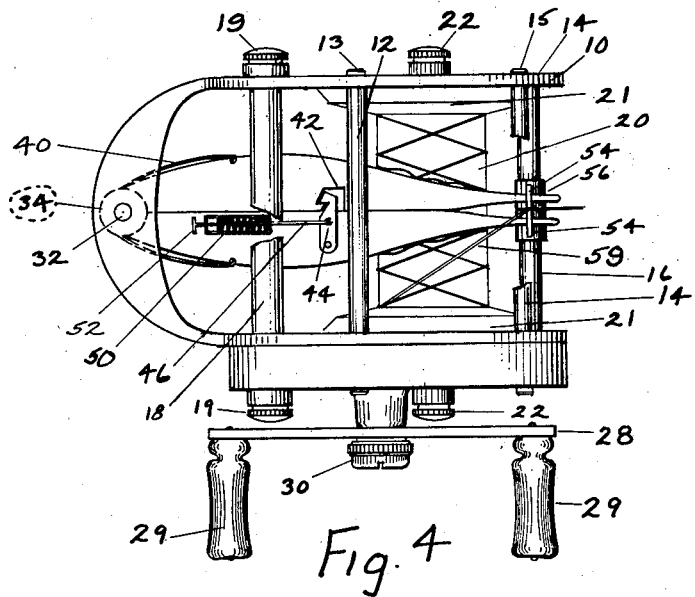

June 9, 1953  W. P. KINSEY  2,641,417
FISHING REEL

Filed Sept. 11, 1947  3 Sheets-Sheet 3

INVENTOR:
WILLIAM P. KINSEY
BY
Rey Eilers
ATTORNEYS.

Patented June 9, 1953

2,641,417

UNITED STATES PATENT OFFICE 2,641,417

FISHING REEL

William P. Kinsey, St. Louis, Mo.

Application September 11, 1947, Serial No. 773,348

20 Claims. (Cl. 242—84.4)

This invention relates to improvements in fishing reels. More particularly this invention relates to an improved fishing reel that provides automatic guiding of the incoming fishing line but provides free movement of the outgoing fishing line.

It is therefore an object of the present invention to provide an improved fishing reel that automatically guides the incoming fishing line but provides free movement of the outgoing fishing line.

In one well recognized and popular method of fishing, it is customary to mount a reel at the lower end of a flexible pole or rod, mount a casting tip at the other end of the rod, and then use the rod to cast bait out onto the water. This method of fishing is known as bait casting; and in this method it is desirable that the fisherman be able to cast the bait as far as possible, thus increasing the area that he can fish while standing in one place. In their attempt to increase the distances the bait can be cast, fishermen have used poles or rods of different kinds, fishing lines of different sizes, weights, and shapes, and reels of different kinds; and those attempts have succeeded in increasing the distance the bait can be cast.

Fishermen have also learned that it is possible to increase the distance the bait can be cast by winding the fishing line onto the spool of the reel in such a manner that the line will pay out freely. In some instances the fishermen grasp the incoming fishing line and move it back and forth across the spool of the reel, thus causing the turns of the line to be distributed evenly along the length of the spool. Where this is done the line should pay out freely without snarling and without hindrance, thus increasing the distance the fisherman can cast the bait. Where the line is guided by hand, it is customary for the angler to use the fingers of one hand to operate the reel and to use the fingers of the other hand to move the incoming line back and forth relative to the spool of the reel. This is a painstaking and difficult process; and reels have been made with double-threaded worm gears that are driven by the spools and are intended to duplicate the work of the fishermen's fingers by moving line guides back and forth relative to the spools of the reels. Such reels relieve the fishermen of much of the work required in reeling in the fishing line. It would seem possible, where the fishing line is guided by hand, to cause each succeeding turn of the incoming fishing line to lie next to the immediately preceding turn; and theoretically it would be possible to make the double threaded worm gears of the reels provide the same result. However, because of human error and because of variations in the thickness of the fishing line, it is not possible in all cases to wind the fishing line onto the spool in such a way that the turns in each layer are touching each other. Instead the fishing line will wind onto the spool with occasional gaps between adjacent turns of the line; and these gaps will be objectionable because the turns of the next layer can slip down into the gaps and be held, temporarily, by the turns forming the gaps. Even a temporary or momentary catching or holding of one turn of the line can interfere with the casting procedure, because the rapidly rotating spool may whisk that turn beyond the point it should pay out of the reel; and thereafter the outgoing fishing line may be bound so tightly to the spool that it may be reeled back onto the rotating spool.

In recognition of this situation, it has become customary to wind the line onto the spool of the reel in such a way that the turns of each layer of line are angularly disposed relative to the turns of the preceding layer. Where the angle between the turns of succeeding layers is large, the turns of any layer are kept from slipping down between the turns of the preceding layer; and the fishing line then pays out freely. Such a formation of the turns is known as a "basket weave" formation. In those fishing reels where line guides are actuated by double threaded worm gears to move the fishing line back and forth, the worm gears are cut to provide as much angular displacement of the line as is possible. However, that amount of displacement is definitely limited by the lineal speeds which the line guides attain during casting; since excessive lineal speeds for the line guides during casting would cause vibration that could severely increase the frictional resistance of the rotating parts of the reels. In actual practice, it has been found that the displacement of the line guides must be limited to such an extent that the turns of one layer cannot be inclined sufficiently to the turns of the preceding layer to keep the turns of the two layers from becoming enmeshed. As a result, the usual reels with reciprocating line guides cannot provide trouble-free casting. Consequently, many fishermen prefer to guide the line by hand; despite the time and care involved. However this time and care cannot always be given, as when a fish has been hooked. For these various reasons the use of the fingers and the use of the usual line guides in winding the fishing line onto the spool of a reel are objectionable. The present invention obviates these objections by providing line guides that automatically provide a "basket weave" formation on the spool as the line is being reeled in, and yet permits free movement of the outgoing line. Such line guides provide a formation on the spool that pays out easily without catching or snarling; and they do not divert or dissipate the kinetic energy of the spool. It is therefore an object of the present invention to provide a fishing reel with line guides that automatically form a "basket weave on the spool," and yet permit free movement of the outgoing line.

The present invention makes this possible by using line guides that can move together to guide the incoming line, and can be separated and held out of contact with the outgoing line. Where this is done, the double-threaded worm gear of the reel will move the line guides back and forth as the line is reeled in, thus providing the desired "basket weave" configuration for the line; and yet that worm gear will not have to move the line guides when the fishing line is being payed out. Consequently there will be practically no drag on the spool of the reel as the line is payed out, and that line can be payed out as rapidly as desired. It is, therefore, an object of the present invention to provide a fishing reel with line guides that can move together to provide a "basket weave" formation for the incoming line, and yet can be separated and held out of contact with the outgoing line.

The line guides of prior fishing reels are usually connected to, and move at the same rate as, the pawl that extends into the grooves of the double threaded worm gear. With such fishing reels, rapid reciprocation of the line guides can only be obtained by unduly increasing the lead of the double threaded worm gear or by increasing the speed of rotation of that gear. Neither alternative is attractive, because both alternatives require an increase in the diversion of energy to the line guides, and both alternatives lead to excessive vibration of the rotating parts of the reel. The present invention obviates these objectionable alternatives, and attains rapid movement of the line guides without reducing the distance the bait can be cast, by providing a reel with line guides that move faster than the pawl of the double-threaded worm gear and that can be disconnected from that pawl when the bait is being cast. The line guides of the present invention have rearwardly extending portions which are pivoted to the reel at a point behind the double-threaded worm gear, and the forward ends of the line guides extend ahead of the worm gear; thus, the movement of the forward ends of the line guides will be amplified relative to the movement of the pawl which extends into the grooves of the double threaded worm gear. By suitably proportioning the dimensions of those portions of the line guide supports that are ahead of and behind the worm gear, any suitable amplification of movement can be obtained. It is, therefore, an object of the present invention to provide a fishing reel wherein the rear portion of each of the line guides is pivoted to the reel at a point behind the worm gear, and wherein the forward ends of the line guides are ahead of that gear.

In winding a fishing line onto the spool of a reel, it is desirable to provide and maintain a certain amount of tension on the line to keep it taut; since a taut line is less likely to become snarled than is a loose line. In fact, it is possible to obtain almost complete elimination of backlash and other entanglements of the line by keeping the line taut as it is being wound onto the spool, and by providing a "basket weave" formation for the line. However, it has not been practical to make the line guides of prior fishing reels so they could provide the amount of tension required on the incoming line to keep that line taut, because those line guides would then also apply serious frictional forces to the line as it was being cast. Consequently, in prior fishing reels if the line is to be payed out without undue frictional resistance, the line guides had to be spaced apart a distance that would make it impossible for those line guides to contact the line and hold it taut as it was being reeled onto the spool. The fishing reel of the present invention, however, is not subject to that limitation because the line guides are separable during the casting procedure; thus they can be brought together to apply sizable frictional forces to the incoming line, but can be separated from the line when the line is cast. It is, therefore, an object of the present invention to provide line guides that can be pressed toward each other to provide and maintain tension on the incoming line, and yet are separable from the line during the casting procedure.

Prior fishing reels that are provided with automatic winding attachments usually have the line guides extending upwardly from a nut which slides back and forth on the double-threaded worm gear; and that nut usually has a pawl which extends into the grooves of the double-threaded worm gear. When the fishing line passes through and is guided by the line guides of such a reel, that line exerts a force on the guides which creates a rotative vector in one direction above the double-threaded worm gear while the pawl that extends into the grooves of the double-threaded worm gear creates a rotative vector in the opposite direction below the worm gear. These two vectors constitute a rotative couple which tends to rotate the nut relative to the axis of the double-threaded worm gear, thus materially increasing the friction between the double-threaded worm gear and the nut. Such friction additionally dissipates the kinetic energy of the spool and further decreases the distances the bait can be cast. The present invention obviates such added friction by locating the line guides and the pawl of the double-threaded worm gear on the same side of that gear. As a result, the two rotative vectors will tend to balance each other; and it is only the difference between the two vectors which will act upon the nut and provide a rotative force. Moreover, the radius of the moment arm acting upon the nut will be materially reduced by this arrangement.

Other and further objects and advantages of the present invention should become apparent from an examination of the drawing and accompanying description.

In the drawing and accompanying description two preferred embodiments of the present invention are shown and described, but it is to be understood that the drawing and accompanying description are for the purposes of illustration only and do not limit the invention and that the invention will be defined by the appended claims.

Figure 2:
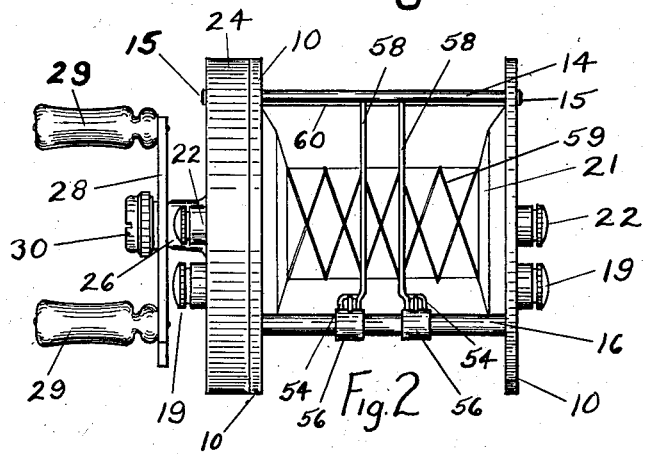
Figure 3:
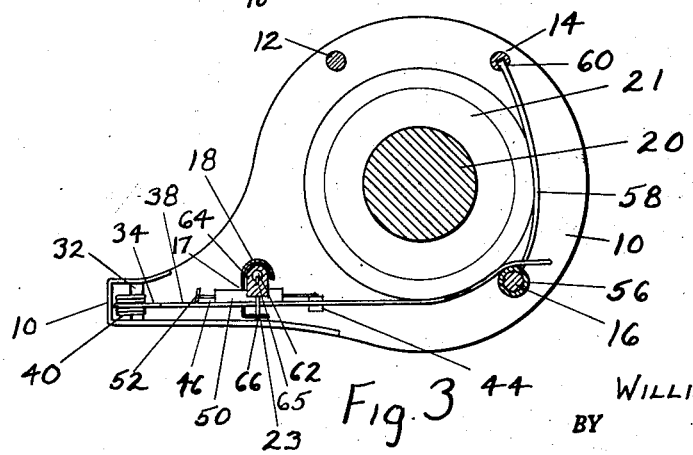
Figure 6:
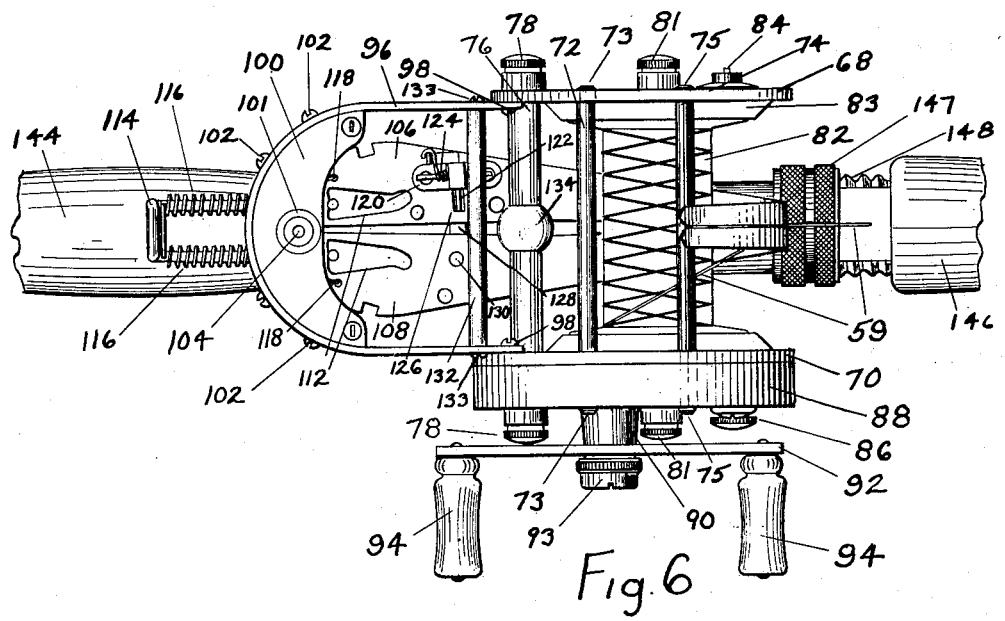
Figure 7:
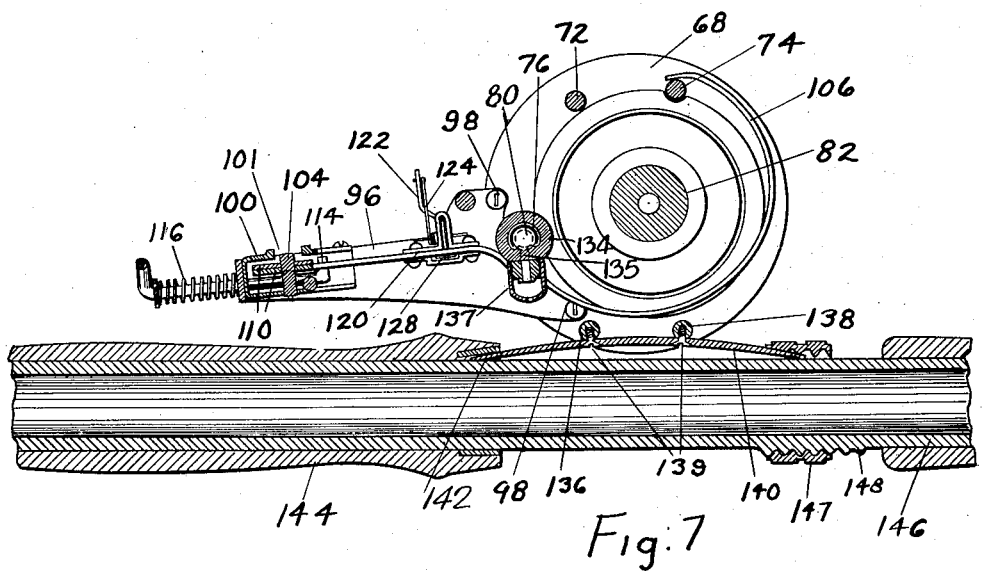

In the drawing,

Fig. 1 is a partially broken-away plan view of a fishing reel that is made in accordance with the principles and teachings of the present invention, and it shows that fishing reel with the line guides thereof spaced apart, Fig. 2 is an end view of the fishing reel shown in Fig. 1, and it shows that fishing reel with the line guides thereof in a position intermediate their separated and side-by-side positions, Fig. 3 is a partial cross sectional view of the fishing reel shown in Figs. 1 and 2, Fig. 4 is a partially broken away plan view of the fishing reel shown in Figs. 1-3, and it shows that fishing reel with the line guides thereof in side-by-side position, Fig. 5 is a plan view of another fishing reel that is made in accordance with the principles and teachings of the present invention, and it shows that fishing reel with the line guides thereof spaced apart, Fig. 6 is a plan view of the fishing reel shown in Fig. 5, and it shows that fishing reel with the line guides thereof in side-by-side position, and Fig. 7 is a partial cross sectional view of the fishing reel shown in Figs. 5 and 6.

Referring to the drawing in detail, the numeral 10 denotes the frame of a fishing reel that is made in accordance with the principles and teachings of the present invention. In Figs. 1-4, the frame 10 is shown as being made of one single piece of metal, but obviously the frame 10 could be made of a number of parts which are suitably secured together. The numeral 12 denotes a cross bar which extends between the inner surfaces of the sides of the frame 10 and maintains those sides in fixed position. The numeral 13 denotes screws or bolts which pass through openings in the side walls of frame 10 and extend into the ends of cross bar 12, thus maintaining that cross bar in assembled relation with the frame 10. A second cross bar 14 is also positioned between the side walls of the frame 10, and that bar is held in position by screws 15 which pass through openings in the side walls of frame 10 and seat in the ends of bar 14. The bar 14, which is spaced forwardly of bar 12, differs from bar 12 in having an axially-extending slot 60 in the under surface thereof. The slot 60 is directed downwardly toward a cross bar 16 which is positioned below and slightly in advance of the cross bar 14. A cover plate 18, that is adjacent the rear of the frame 10, extends between the side walls of the frame 14 and serves to space those side walls apart at the same time it covers and protects a double-threaded worm gear 62. The three cross bars 12, 14 and 16 and the cover plate 18 act to stiffen the frame 10 at the same time they space the walls of that frame apart. Thus a strong and sturdy construction is possible for the fishing reel.

The cover plate 18 has a semi-cylindrical upper portion, a vertically disposed rear wall, and a horizontally disposed bottom. The rear wall of cover plate 18 has an elongated slot 17 that extends throughout a substantial portion of the length of the cover plate, and the bottom of cover plate 18 has an elongated slot 23 that also extends throughout a substantial portion of the length of cover plate 18. The double-threaded worm gear 62, which is protected by cover plate 18, is rotatably supported by the side walls of frame 10. The worm gear 62 is held against shifting from side to side by end-thrust adjusting set screws 19. A line-carrying spool 20, which is partially broken away in Figs. 1 and 4, is positioned between the side walls of the frame 10; and that spool is rotatably mounted in the side walls of frame 10. The rotatable spool 20 is provided with radially extending flanges 21, and those flanges are positioned immediately adjacent the inner surfaces of the side walls of the frame 10. End-thrust adjusting set screws 22 are provided adjacent the ends of the shaft, not shown, on which the spool 20 is mounted, and those set screws bear against the ends of that shaft and limit end play of the spool 20.

A gear box 24 is secured to one of the side walls of frame 10, and that gear box contains gears, not shown, which interrelate the rotation of the spool 20 and the rotation of the double threaded worm gear 62. The gear box 24 is provided with an annular projection 26 that extends outwardly from the side of the gear box; and the projection 26 encloses a shaft, not shown, which carries a crank 28. The crank 28 is provided with handles 29 rotatably mounted on the ends thereof, and those handles facilitate the grasping of the crank 28 by the fisherman. A retaining nut 30 maintains the crank 28 in assembled relation with the shaft that extends through the projection 26 into the gear box 24. With this construction, the fisherman can grasp either one of the handles 29 and rotate the crank 28; thus causing conjoint and simultaneous rotation of the spool 20 and the double threaded worm gear 62.

The rear portion of the frame 10 is formed with a cover plate that extends horizontally between the rear portions of the side walls of the frame 10. A similar plate, disposed below the first plate, also extends horizontally between the side walls of the frame 10. These two cover plates serve to support a vertically disposed pin 32 that acts as a fulcrum for the two arms 36 and 38 of the fishing reel. These arms, which are in effect rear portions of the line guides of the reel, are each provided with an annular portion 34 that encircles, and is held by, the pin 32. In Fig. 3, only one of the annular portions is shown, but that annular portion and the annular portion of arm 36 will maintain the arms 36 and 38 in assembled relation with the pin 32 while permitting the arms 36 and 38 to rotate about that pin. A spring 40, which is bent around the pin 32 and is secured to the outer edges of arms 36 and 38, is biased to move the two arms 36 and 38 apart. Thus, in the absence of some means to hold the arms 36 and 38 side-by-side, the spring 40 will cause the arm 36 to move toward one side wall of frame 10 and will cause the arm 38 to move toward the other side wall of frame 10. Although biased apart by spring 40, the arms 36 and 38 can be held in side-by-side position by a notch 42 of irregular shape in arm 36 and a catch 44 on arm 38. The catch 44 has a shape and configuration which is similar to the shape and configuration of the notch 42; and when the catch 44 is lodged in notch 42, the arms 36 and 38 will be held side-by-side. The catch 44 is biased for counter-clockwise rotation by the action of spring 48 on plunger 46; and as the arms 36 aand 38 are moved together, as by grasping the forward ends thereof and pressing them toward each other, the catch 44 will engage the notch 42, will be given a clockwise rotation until it moves into the notch 42, and will then be rotated counter-clockwise by the spring 48 into intimate and locking engagement with the notch 42. The force of the spring 48 will be transmitted to the rotatably mounted catch 44 by the plunger 46; and the plunger 46 is provided with an enlarged projection that engages the end wall of guide 50 to enable the plunger 46 to hold the end of catch 44 in register with notch 42. The guide 50 positions plunger 46 and spring 48 on the arm 38; and the plunger 46 is provided with an enlarged head 52. This enlarged head 52 is located adjacent the thumb of the fisherman, and thus whenever he wishes to separate the two arms 36 and 38, the fisherman need only press against the enlarged head 52 of the plunger 46. This releases the arms and permits the spring 40 to move the arms 36 and 38 apart.

The cross bar 16 at the front of the frame 10 is provided with movable sleeves 56. These sleeves have loops 54 secured to the upper surfaces thereof, as by soldering, brazing, welding, or any other suitable means; and they also have upstanding line guides 58 secured to them. With this arrangement, reciprocatory movement of the sleeves 56 will cause the line guide 58 and the loops 54 to move back and forth relative to the spool 20. The loops 54 are dimensioned to receive the forward ends of the arms 36 and 38, and the reciprocatory movement of arms 36 and 38 will cause the line guides 58 to move back and forth. The line guides 58 are substantially straight throughout most of their length, but they have offset portions adjacent the bottoms thereof. These offset portions make it certain that the straight portions of the line guides 58 can bear against each other whenever the arms 36 and 38 are held together by the catch 44 and notch 42. The upper ends of the line guides 58 are slidably positioned in and move relative to the slot 60 in the cross bar 14. Thus the line guides 58 are guided at their tops and bottoms, and are caused to move back and forth relative to the spool 20.

As the double-threaded worm gear 62 rotates, in response to rotation of the crank 28, that gear moves a nut 64 back and forth relative to the spool 20. This nut is provided with a pin 65 that extends into the groove of worm gear 62; and that pin will cause the nut to reciprocate. The nut 64 is also provided with a finger 66 that extends downwardly and is positioned in the elongated slot 23 in the bottom of cover plate 18. The slot 23 guides the movement of finger 66, as that finger moves in response to rotation of crank 28. The finger 66 extends between the inner edges of arms 36 and 38 and causes those arms, whenever the catch 44 is lodged in notch 42 and whenever the crank 28 is rotating, to move back and forth relative to spool 20. The horizontal slot 17 in the rear wall of cover plate 18 makes this movement of the arms 36 and 38 possible.

With the reel shown in Figs. 1–4, the arms 36 and 38 will always tend to move toward the side walls of the frame 10. With such a construction the fisherman need only press his thumb, or any other part of his hand, against the enlarged head 52 of the plunger 46 to cause separating movement of arms 36 and 38. Immediately, the two arms 36 and 38 will separate and will move the line guides 58 away from the line 59 that is secured to the spool 20. The sleeves 56 which slide relative to the cross bar 16 are so dimensioned that they permit the line guides 58 to move outwardly beyond the central portion of the spool 20. In fact, the line guides 58 come to rest approximately in the planes of the flanges 21 of spool 20. As a result, when the arms 36 and 38 are at the sides of the frame 10, the line 59 can be payed out without contacting the line guides 58. Thus, there is but little resistance to the casting of the fishing line. The separation of the arms 36 and 38 not only moves line guides 58 out of contact with line 59, but it also frees finger 66 of the job of moving the arms 36 and 38, sleeves 56, and line guides 58. Consequently, the spool 20 can rotate with a minimum of resistance.

When the fishing line 59 is to be wound onto spool 20, as by rotation of crank 28, the line guides 58 should be brought together to guide the line 59 and make sure that the line 59 is properly wound onto spool 20. This can be done by pressing the line guides 58 together with one's fingers until the catch 44 lodges in notch 42, thereupon the two arms 36 and 38 will be locked in engagement with the finger 66 that depends downwardly from the nut 64 on double-threaded worm gear 62. Rotation of crank 28 will then cause the guides 58 to move back and forth relative to the spool 20. This provides a "basket weave" configuration for the line 59 on spool 20, as shown in Figs. 1, 2 and 4. The line guides will press against the line 59 as it is being wound onto spool 20, and this pressure keeps a uniform and even tension on the line between spool 20 and line guides 58. That tension greatly facilitates proper winding of the line 59 and avoids back lashes during casting.

It will be noted that the arms 36 and 38 are pivoted to the frame 10 at a point behind the double-threaded worm gear 62, and it will also be noted that the line guides 58 are positioned ahead of the double-threaded worm gear 62. This enables the fishing reel of the present invention to provide a mechanical arrangement whereby the line guides 58 move farther and faster than the nut 64 on double-threaded worm gear 62 moves. This mechanical arrangement enables the line 59 to be moved angularly relative to the spool 20, and enables the line 59 to wind onto the spool 20 and then be cast without back lash. As a matter of fact, it has been found that making the distance from the line guides 58 to the pivot 34 five times the distance between the double-threaded worm gear 62 and the pivot 34 provides an extremely efficient and useful "basket weave" configuration for the line 59. With such a configuration the line 59 can easily be cast for extremely long distances; and all of this without necessitating any skill in winding the line 59 onto the spool 20. This is quite a contrast to prior constructions which required the fisherman to guide the line with his fingers or forced him to use line guides that always retarded movement of the line.

It will be noted that the arms 36 and 38 are on the same side of the double-threaded worm gear 62 as is the pin 65. This means that when the incoming line 59 applies a force to the line guides 58, that force will be on the same side of the axis of worm gear 62 as is the force which worm gear 62 applies to pin 65. These two forces, which are the principal forces acting on nut 64, will tend to balance each other or at least to provide one single resultant force that acts upon the nut 64. This resultant force will have a relatively small moment arm since that arm cannot be any longer than the distance from the axis of worm gear 62 to the arms 36 and 38. Such a construction is quite a contrast to prior fishing reels which were provided with double threaded worm gears for driving line guides, because the line guides and the pins of those reels were on opposite sides of the axes of the worm gears. Those prior constructions had two oppositely acting forces with the axes of the worm gears as their centers, and consequently the nuts tended to bind on the worm gears; thus additionally increasing the frictional forces on the double-threaded worm gear. By reducing such rotative action to a minimum, the present invention increases the casting range.

Figs. 5–7 show another fishing reel that is made in accordance with the principles and teachings of the present invention. The numeral 68 denotes one of the spaced side walls of the frame of the fishing reel, and the numeral 70 denotes the other side wall of that frame. A bar 72 extends between and spaces the two walls 68 and 70 apart; and screws 73 are provided which pass through holes in side walls 68 and 70 and seat in the ends of the bar 72 to maintain the walls 68 and 70 in assembled relation with bar 72. A cross bar 74, which is similar to bar 72, is positioned between side walls 68 and 70; and that bar is spaced forwardly of the bar 72. Screws 75 extend through openings in the side walls 68 and 70 and seat in threaded openings in the ends of bar 74, thus further assisting in maintaining the walls 68 and 70 in assembled relation. A cover plate 76 is provided for the double threaded worm gear 80 which is rotatably supported by the side walls 68 and 70; and the cover plate 76 also extends between and assists in spacing apart the side walls 68 and 70. End-thrust adjusting set screws 78 are provided to maintain the double threaded worm gear 80 in position and to avoid translation of that gear. A spool 82 is positioned between the side walls 68 and 70, and it is rotatably supported by those walls. The side edges of the spool 82 are provided with flanges 83 that project radially outwardly from the spool 82. End-thrust adjusting screws 81 are provided to avoid translation of the spool 82.

A "click" is provided on the side wall 68 of the fishing reel, and that "click" is denoted by the numeral 84. The "click" 84 is connected to the spool 82 in such a way that as the spool 82 rotates it causes the "click" 84 to move back and forth in the manner of an escapement mechanism. A characteristic "clicking" noise is made by the "click" 84, and it is that noise which gives the "click" its name. The numeral 86 denotes a a friction brake which is mounted on side wall 70, and which applies a predetermined amount of friction to the spool 82 as the fishing line is being reeled in. The "click" 84 and the friction brake 86 are of the type used on commercially available fishing reels, and they perform the functions which they customarily perform on such reels. The "click" 84 and the friction brake 86 are not important parts of the fishing reel provided by the present invention, as is indicated by their non-use in Figs. 1–4; however, they can be provided and used as shown in Figs. 5–7.

A gear box 88 is attached to the side wall 70 of the reel, and it encloses the gears which interconnect the spool 82 and the double-threaded worm gear 80. An annular projection 90 extends outwardly from the gear box 88, and the shaft which drives the spool 82 extends through this housing 90 and is provided at its outer end with a crank arm 92. The crank arm 92 is held in assembled relation with the shaft inside projection 90 by means of a locking nut 93. The outer ends of the crank arm 92 are provided with rotatable handles 94 to facilitate operation of the crank arm 92 by the fisherman.

A U-shaped frame 96 is secured to the rear portions of the side walls 68 and 70 by means of screws 98. This U-shaped frame is provided with a cover plate 100 that fits within the closed end of the U-shaped frame 96 and is secured in position by screws 102. The U-shaped frame 96 is also provided with a transversely extending stiffening rod 132 that is held in position by screws 133. The cover plate 100 has a central opening 101, and that opening is in register with a pin 104 which is permanently secured to the bottom portion of the cover plate 100. Two rotatable arms are denoted by the numerals 106 and 108; and each of the arms has an annular section 110 which is dimensioned to fit over and be held by the pin 104. The interaction between the annular sections 110 and the pin 104 provides a fulcrum for the arms 106 and 108, thus permitting limited rotation of those arms relative to the frame 96 and the side walls 68 and 70. Each of the arms 106 and 108 is provided with a cam slot 112 of irregular shape; and a U-shaped plunger 114, which is slidably supported by the U-shaped frame 96 and the cover plate 100, has upturned ends which are spaced apart and extend upwardly into the cam slots 112 of the arms 104 and 106. The U-shaped plunger 114 is normally held in retracted position by the helical springs 116 which have their ends bearing against the closed end of the U-shaped plunger 114 and their other ends pressing against the U-shaped frame 96. With this construction, the U-shaped plunger 114 will normally be in the position shown in Fig. 6, but it can be moved to the right to enable the inner ends thereof to press against the inner edges of the cam slot 112, thus causing rotative movement of the arms 106 and 108 about the pin 104. A spring 118, partially shown in Fig. 6, is provided within the housing or cover plate 100, and that spring tends to force the arms 106 and 108 apart. Thus, in the absence of any locking means, the arms 106 and 108 tend to open and free the line 59, being reeled onto or payed off the spool 82, for unimpeded movement.

A latching means is provided to hold the arms 106 and 108 together for conjoint movement; and that means consists of a pivot bracket 120 permanently secured to the arm 106, a catch 122 pivotally mounted within the pivot bracket 120, and a spring 124 which is secured to the pivot bracket 120 and presses against the catch 122. The spring 124 is so positioned relative to the catch 122 that it urges the lower end of the catch 122 downwardly through an opening 126 in the bar 106. This opening in the arm 106 is in register with an arcuate rod 128 that is secured to and movable with the arm 108. The arcuate rod 128 is riveted to arm 108 by rivets 130 and it has a slot 129 therein; and when the arms 106 and 108 are side-by-side, the catch 122 will be pressed downwardly into the opening or slot 129 in the rod 128. This catch will then act to hold the arms 106 and 108 in assembled relation. However, the arms 106 and 108 can easily be separated for independent movement by pressing against the upper end of the catch 122, thus overcoming the force of the spring 124 and raising the lower end of the catch 122 out of the opening 129 of rod 128. When the arms 106 and 108 separate, the arms will move outwardly until they touch the side walls 68 and 70 of the reel. The forward ends of the arms 106 and 108 are formed so they loop upwardly in an arcuate manner, but they are so dimensioned that they do not touch the flanged side walls 83 of the spool 82. As a result, the spool 82 can rotate without any pressure or resistance from the arms 106 and 108.

The lower portions of the side walls 68 and 70 are provided with stiffening rods 136 and 138 that extend between and are secured to the side walls 68 and 70. These stiffening rods receive screws 139 which are supported by a plate 140; and these screws secure the entire reel to the plate 140. The forward and rear edges of the plate 140 are tapered, and the rear edges of the plate fit into a recess 142 in the handle 144 of the rod 146. The forward edge of the plate 140 fits into an annular sleeve 147 that can be moved backwards and forwards relative to the rod 146 by means of threads 148 on the rod 146. With this construction, the plate 140 can be slipped into the recess 142 in the handle 144, and thereafter the other end of the plate 140 can be pressed against the rod 146 and the sleeve 147 rotated up and over the forward edge of plate 140. The reel is then solidly secured to the rod 146.

A nut 134 is mounted on the double-threaded worm gear 80; and that nut has a pin 135 which extends into the grooves in the gear 80, thus enabling the double-threaded worm gear 80 to move the nut 134 to and fro relative to the spool 82. The nut 134 has a downwardly projecting lower portion 137, and that portion is positioned between and bears against the two arcuate surfaces on the inner edges of the arms 106 and 108. When the arms 106 and 108 are pressed together the catch 122 will drop into the slot 129 in the arcuate rod 128, thus locking the arms for conjoint movement. At that time the arms will be on opposite sides of the nut 134, and rotation of the crank arm 92 will cause the nut 134 to move the arms back and forth. The forward ends of the arms 106 and 108 will then be together except where they are held apart by the fishing line 59 which is being wound onto the reel 82; and those two closely adjacent ends will move the line back and forth relative to the spool 82, thus providing a "basket weave" formation on the spool. This "basket weave" is shown particularly in Fig. 6; and it prevents backlash by keeping the sections of line 59 in any one layer from becoming wedged between sections of line in an adjacent layer. The "basket weave" formation is not as pronounced as it is in Figs. 1–5 because the mechanical advantage of the reel is not as great. In the present instance the mechanical advantage is approximately two to one since the distance from the outer ends of the arms 106 and 108 to the pivot point 104 is only about two times the distance from the double-threaded worm gear 80 to the pivot point 104. However, the "basket weave" formation provided by the reel of Figs. 5–7 is considerably better than the formation obtained with prior reels; and extremely long casts have been obtained with it.

During the operation of reeling in the fishing line, the forward ends of the arms 106 and 108 act as line guides and move the line 59 back and forth across the reel. As they do so, they press on the line 59 and provide a certain amount of tension in that line; and this tension avoids backlash during the casting operation. When the fisherman is ready to cast, he merely presses against the upper end of the catch 122, thus overcoming the pressure of spring 124 and lifting the lower end of the catch 122 out of the slot 129 in the arcuate rod 128. This permits the spring 118 to separate the arms 106 and 108 promptly; and those arms will rest against the side walls 68 and 70 of the reel and be out of the way of the outgoing line 59. It will be noted that the flanges 83 of the spool 82 are approximately as wide as the ends of the arms 106 and 108, and thus there will be no tendency for the line 59 to rub against and be impeded by contact with the inner edges of the arms 106 and 108. At the conclusion of the casting operation, all that the fisherman need do is to press forwardly on the closed end of the U-shaped member 114; the forward ends of that member cooperating with the cam slots 112 to press the arms 106 and 108 together. This permits the catch 122 to drop into the slot 129 of rod 128 and hold the two arms together for conjoint movement. Thereafter the fisherman need only turn the crank 92 to retrieve the line 59.

It will be noted that the pin 135 and the projection 137 are on the same side of the axis of worm gear 80. As a result, the forces on nut 134 tend to offset each other and provide a single resultant force which is of small magnitude and has only a small moment arm. This reduces the tendency of the nut 134 to bind on the gear 80.

Whereas two preferred embodiments of the present invention have been shown and described in the drawing and accompanying description it should be obvious to those skilled in the art that various changes can be made in the form of the invention without affecting the scope thereof.

What I claim is:

1. In a fishing reel that has a frame, a rotatable line-carrying spool, a crank to cause rotation of said spool, and a double-threaded worm gear that is geared to said spool, the improvement which comprises a pair of arms pivoted to said frame and having line guiding portions at the front thereof, said arms being movable relative to each other and to said frame, said arms being selectively acted upon intermediate their lengths by an actuator reciprocated by said double-threaded worm gear, and a latch selectively operable to hold said arms in engagement with said actuator or to free said arms from said actuator, whereby said arms can guide the fishing line or can be freed from that line to facilitate ready casting thereof.

2. In a fishing reel that has a frame, a rotatable line-carrying spool, a crank to cause rotation of said spool, and a double-threaded worm gear that is geared to said spool, the improvement which comprises a pair of arms pivoted to said frame at a point in the rear of said spool, said arms being movable relative to each other and to said frame, an actuator reciprocated by said double-threaded worm gear, said arms having line-guiding portions in front of said spool and being connected to said double-threaded worm gear by said actuator at points intermediate the lengths of said arms.

3. In a fishing reel that has a frame, a rotatable line-carrying spool, a crank to cause rotation of said spool, and a double-threaded worm gear that is geared to said spool, the improvement which comprises a pair of arms pivoted to said frame at a point in the rear of said spool, said arms being movable relative to each other and to said frame, an actuator reciprocated by said double-threaded worm gear, said arms having line-guiding portions in front of said spool and being connected to said double-threaded worm gear by said actuator at points intermediate the lengths of said arms, and a latch to selectively hold said arms in engagement with said actuator or to free said arms from said actuator, said arms being dimensioned so the distance from the line-guiding portions of the arms to the pivot is greater than twice the distance between the double-threaded worm gear and the pivot.

4. In a fishing reel that has a frame, a rotatable line-carrying spool, a crank to cause rotation of said spool, and a double-threaded worm gear that is geared to said spool, the improvement which comprises a pair of arms pivoted to said frame at a point in the rear of said spool, an actuator driven by said double-threaded worm gear, and interacting surfaces on said arms that selectively hold said arms for movement with said actuator or release said arms from said actuator, said arms having line-guiding portions in front of said spool and being connected to said double-threaded worm gear by said actuator at points intermediate the lengths of said arms, said arms being separable to free the line on said spool from contact with said line-guiding portions of said arms.

5. In a fishing reel that has a frame, a rotatable line-carrying spool, a crank to cause rotation of said spool, and a double-threaded worm gear that is geared to said spool, the improvement which comprises a pair of arms pivoted to said frame at a point in the rear of said spool, an actuator driven by said double-threaded worm, said arms having line-guiding portions in front of said spool and being connected to said double-threaded worm gear by said actuator at points intermediate the lengths of said arms, said arms being separable to free the line on said spool from contact with said line-guiding portions of said arms, and locking means that is adapted to releasably lock said arms together and to said actuator driven by said double-threaded worm gear.

6. In a fishing reel that has a frame, a rotatable line-carrying spool, a crank to cause rotation of said spool, and a double-threaded worm gear that is geared to said spool, the improvement which comprises a pair of independently movable line guides, and a connection that is operable to releasably connect said line guides together and to said double-threaded worm gear.

7. In a fishing reel that has a frame, a rotatable line-carrying spool, a crank to cause rotation of said spool, and a double-threaded worm gear that is geared to said spool, the improvement which comprises a pair of arms pivoted to said frame, an actuator that is driven by said double-threaded worm gear and can move said arms, a resilient element that biases said arms for movement away from each other, and a locking member that releasably connects said arms together for movement by said actuator.

8. In a fishing reel that has a frame, a rotatable line-carrying spool, a crank to cause rotation of said spool, and a double-threaded worm gear that is geared to said spool, the improvement which comprises a pair of arms, an element biasing said arms for movement away from each other, a locking member that releasably connects said arms together, and a member that is movable axially of said spool by said double-threaded worm gear and can drive said arms, said arms being adapted to engage said movable member and to be moved by said member whenever said arms are locked together.

9. A fishing reel that comprises a frame, a spool rotatably supported by said frame, a pair of independently movable line guides that are movable toward and away from each other along a line parallel to the axis of said spool, said line guides being separable from each other and from the line to permit unimpeded casting and being movable together to guide the line as it is wound onto the spool, and a latch releasably holding said line guides for conjoint movement.

10. A fishing reel that comprises a frame, a spool rotatably supported by said frame, a pair of independently movable line guides that are movable toward and away from each other along a line parallel to the axis of said spool, said line guides being separable from each other and from the line to permit unimpeded casting and being movable together to guide the line as it is wound onto the spool, and a latch releasably holding said line guides for conjoint movement, and a double-threaded worm gear, said worm gear operating to cause reciprocatory movement of said line guides when the line is being wound onto said spool.

11. A fishing reel that comprises a frame, a spool rotatably supported by said frame, a pair of independently movable line guides that are movable toward and away from each other along a line parallel to the axis of said spool, said line guides being separable from each other and from the line to permit unimpeded casting and being movable together to guide the line as it is wound onto the spool, and a latch releasably holding said line guides for conjoint movement, said line guides being adapted to press against said line and hold it taut as it is wound onto the spool.

12. A fishing reel that comprises a frame, a spool rotatably supported by said frame, a pair of independently movable line guides that are movable toward and away from each other along a line parallel to the axis of said spool, said line guides being separable from each other and from the line to permit unimpeded casting and being movable together to guide the line as it is wound onto the spool, and a latch releasably holding said line guides for conjoint movement, said line guides having offset portions that press against the line being wound onto the spool.

13. In a fishing reel, a rotatably mounted spool, a rotatable gear, a member that moves from side to side in response to rotation of said gear, and line guides mounted for movement toward and away from each other and toward and away from said member, said line guides being selectively movable with or separable from each other and from said member while in assembled relation with said reel, whereby said line guides can guide the line as the line is wound onto said spool but can be freed from said line as the line is cast.

14. In a fishing reel, a rotatably mounted spool, a rotatable gear, a member that is moved from side to side by said gear, line guides mounted for movement toward and away from each other and toward and away from said member, and a locking element, said locking element releasably securing said line guides to said member, said line guides being movable with or separable from said member while in assembled relation with said reel, whereby said line guides can guide the line as the line is wound onto said spool but can be freed from said line as the line is cast.

15. In a fishing reel, a rotatably mounted spool, a rotatable gear, a member that is moved from side to side by said gear, line guides mounted for movement toward and away from each other and toward and away from said member, and a locking element, said locking element releasably securing said line guides to said member, said line guides being movable with or separable from said member while in assembled relation with said reel, whereby said line guides can guide the line as the line is wound into said spool but can be free from said line as the line is cast, said line guides having a pivot positioned on one side of the gear and having the line engaging portions thereof on the other side of said gear.

16. In a fishing reel, a rotatably mounted spool, a rotatable gear, a member that is moved from side to side by said gear, line guides mounted for movement toward and away from each other and toward and away from said member, and a locking element, said locking element releasably securing said line guides to said member, said line guides being movable with or separable from said member while in assembled relation with said reel, whereby said line guides can guide the line as the line is wound into said spool but can be freed from said line as the line is cast, said line guides having a pivot positioned on one side of the gear and having the line engaging portions thereof on the other side of said gear, the distance from the line engaging portions of the line guides to the pivot therefore being more than twice the distance from said gear to said pivot.

17. In a fishing reel, a rotatably mounted spool, a rotatable gear, a member that is moved from side to side by said gear, line guides mounted for movement toward and away from each other and toward and away from said member, and a locking element, said locking element releasably securing said line guides to said member, said line guides being movable with or separable from said member while in assembled relation with said reel, whereby said line guides can guide the line as the line is wound into said spool but can be freed from said line as the line is cast, said member acting on said line guides intermediate their lengths.

18. In a fishing reel that has a frame, a rotatable line carrying spool, a crank to cause rotation of said spool, and a double-threaded worm gear that is geared to said spool, the improvement which comprises a pair of independently movable line guides, and a connection that is operable to releasably connect said line guides together and to said double-threaded worm gear, said connection including a latch that is carried by one line guide and is releasably engageable with the other line guide.

19. In a fishing reel that has a frame, a rotatable line carrying spool, a crank to cause rotation of said spool, and a double-threaded worm gear that is geared to said spool, the improvement which comprises a pair of independently movable line guides, and a connection that is operable to releasably connect said line guides together and to said double-threaded worm gear, said connection including a latch that is carried by one line guide and is releasably engageable with the other line guide, and a resilient member biasing said line guides apart, whereby said line guides will move apart and free the line for unimpeded casting when said latch is disengaged from said other line guide.

20. In a fishing reel that has a frame, a rotatable line carrying spool, a crank to cause rotation of said spool, and a double-threaded worm gear that is geared to said spool, the improvement which comprises a pair of independently movable line guides, and means operable to releasably connect said line guides together and to said double-threaded worm gear, said means including a latch that is carried by one line guide and is releasably engageable with the other line guide.

WILLIAM P. KINSEY.

References Cited in the file of this patent

UNITED STATES PATENTS

| Number | Name | Date |
|---|---|---|
| 1,417,632 | Russell | May 30, 1922 |
| 1,468,128 | Adams | Sept. 18, 1923 |
| 1,484,906 | Russell | Feb. 26, 1924 |
| 2,461,884 | Elsminger | Feb. 15, 1949 |

FOREIGN PATENTS

| Number | Country | Date |
|---|---|---|
| 363,597 | Great Britain | Dec. 24, 1931 |